(12) United States Patent
Noro (10) Patent No.: US 7,853,232 B2
(45) Date of Patent: Dec. 14, 2010

(54) LOW-NOISE AMPLIFIER AND ANTENNA DEVICE HAVING THE SAME

(75) Inventor: Junichi Noro, Akita (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 667 days.

(21) Appl. No.: 11/646,742

(22) Filed: Dec. 28, 2006

(65) Prior Publication Data

US 2008/0113639 A1 May 15, 2008

(30) Foreign Application Priority Data

Dec. 28, 2005 (JP) .............................. 2005-377680

(51) Int. Cl.
*H04B 1/18* (2006.01)
(52) U.S. Cl. ..................... 455/293; 455/296; 455/341; 455/307; 343/700 MS
(58) Field of Classification Search .................. 455/293, 455/341, 296, 307; 343/700 MS
See application file for complete search history.

(56) References Cited

U.S. PATENT DOCUMENTS

| 4,282,547 | A | * | 8/1981 | Morishita | .................... 348/276 |
| 7,109,925 | B2 | | 9/2006 | Noro et al. | |

FOREIGN PATENT DOCUMENTS

| JP | 2002-237764 | A | 8/2002 |
| JP | 2004-015096 | A | 1/2004 |
| JP | 2004-032674 | A | 1/2004 |
| JP | 2004-260555 | A | 9/2004 |
| JP | 2005-109602 | A | 4/2005 |
| WO | WO 00/19621 | A1 | 4/2000 |

OTHER PUBLICATIONS

Japanese Office Action dated Jul. 14, 2010 and English translation thereof in counterpart Japanese Application No. 2005-377680.

* cited by examiner

*Primary Examiner*—Sanh D Phu
(74) *Attorney, Agent, or Firm*—Holtz, Holtz, Goodman & Chick, PC (57) ABSTRACT

To provide an antenna device adapted to interrupt jamming waves and enable cost reduction, a high-pass filter (HPF) adapted to interrupt general-use frequencies at least near a low-frequency side of a pass band intended for use is provided as a frequency selection circuit 11A on the antenna 1 side in an initial-stage LNA 2A. By setting a low-side cutoff frequency to 900 MHz, it is possible to prevent reception of frequencies in a general-use frequency band with a high frequency of use as jamming waves. That is, for example, it is possible to prevent reception of frequencies in 800 to 900 MHz band for mobile cellular telephones and higher harmonics thereof as jamming waves. Further, since an additional filter is not required in the antenna device, the circuit structure can be simplified.

5 Claims, 6 Drawing Sheets

LOW-NOISE AMPLIFIER AND ANTENNA DEVICE HAVING THE SAME

This application claims priority to prior Japanese application JP 2005-377680, the disclosure of which is incorporated herein by reference.

BACKGROUND OF THE INVENTION

This invention relates to an antenna device that is used in a receiver adapted to receive signals transmitted from an artificial satellite and, particularly, that realizes cost reduction while improving the anti-jamming performance, and further relates to a low-noise amplifier for use in such an antenna device.

Figure 1:
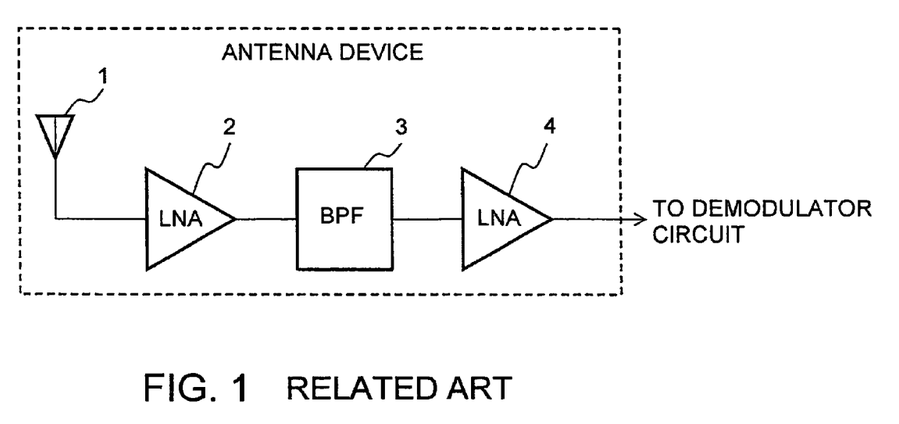
FIG. 1 is a block diagram showing an example of a related antenna device.

As shown in FIG. 1, a related antenna device is a series-connected circuit comprising an antenna 1, an initial-stage or first-stage low-noise amplifier (hereinafter abbreviated as an "LNA") 2, a band-pass filter (hereinafter abbreviated as a "BPF") 3, and a last-stage or second-stage LNA 4 connected in series and feeds its output to a demodulation circuit. Since signal waves received by such an antenna device, which are transmitted, for example, from an artificial satellite or the like, are weak, the first-stage and the second-stage LNAs 2 and 4 are essential components in the antenna device.

Figure 2:
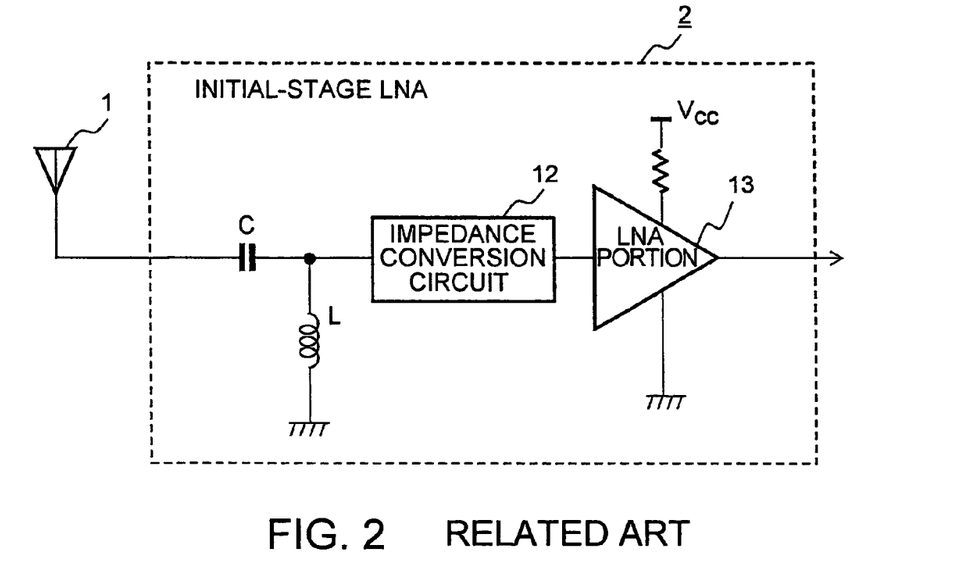
FIG. 2 is a block diagram showing an example of an initial-stage LNA (low-noise amplifier) in the related antenna device.

Connected firstly to the antenna 1, the initial-stage low-noise amplifier (initial-stage LNA) 2 comprises, as shown in FIG. 2, a capacitor C and an inductor L, an impedance conversion circuit 12, and a low-noise amplification portion (hereinafter abbreviated as an "LNA portion") 13.

Figure 3:
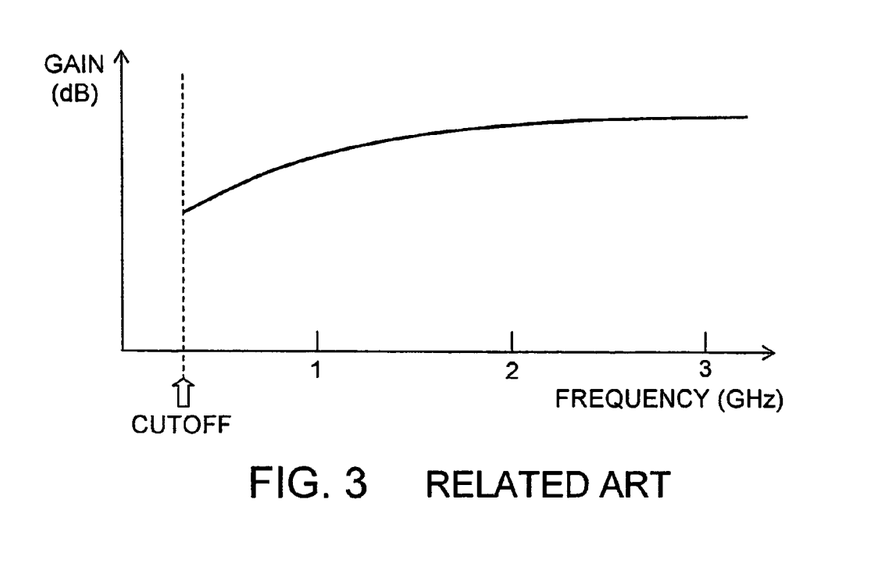
FIG. 3 is a graph showing an example of the frequency characteristic of the initial-stage LNA shown in FIG. 2.

For example, the LNA portion 13 comprises low-noise transistors. Each low-noise transistor may a CMOSFET (complementary metal oxide semiconductor field effect transistor) such as a GaAsFET or a HEMT (high electron mobility transistor). The capacitor C and the inductor L are required as an input matching circuit for the LNA portion 13. The capacitor C is a coupling capacitor whose capacitance is adjustable. The inductor L is used for grounding gates of the low-noise transistors used in the LNA portion 13 and may be a pattern inductor comprised of an inductor, a resistor, and so on. The input matching circuit formed by the capacitor C and the inductor L is adapted for the GPS (Global Positioning System), satellite digital radio broadcasting services, and so on in Japan and the U.S.A. and, further, for general satellite radio-wave services and so on in Europe, Russia, and so on. That is, as shown in FIG. 3, it is designed so that the initial-stage LNA 2 directly connected to the antenna 1 is adapted to receive signals from satellites over a wide frequency range on the order of gigahertz (GHz).

The impedance conversion circuit 12 is necessary for achieving impedance matching with an output of the antenna 1. The LNA portion 13 has a high input impedance and, therefore, the impedance matching with a 50-ohm impedance of the antenna output is required on the input side of the low-noise transistor of the LNA portion. For this purpose, the impedance conversion circuit 12 has a pattern having a quarter-wavelength ($\lambda/4$) that is connected to the input side of the LNA portion 13.

In the foregoing antenna device, the initial-stage LNA 2 connected to the antenna 1 has a pass band which is set to cover all frequency bands intended for general use. Therefore, the pass band of the initial-stage LNA 2 includes such a frequency band that corresponds to a specific use other than that of a receiver incorporating the antenna device. For example, 800 to 900 MHz for cellular phones with a high frequency of use may be included in the pass band of the initial-stage LNA 2 so as to be jamming waves. Consequently, it is expected that many jamming waves are mixedly fed into the LNA portion 13 used in the initial-stage LNA 2. Therefore, in order to prevent this, it is necessary that a trap circuit or a band-elimination filter (BEF), adapted for the specific use to block the jamming waves, be provided on the input side of the initial-stage LNA 2.

Figure 4:
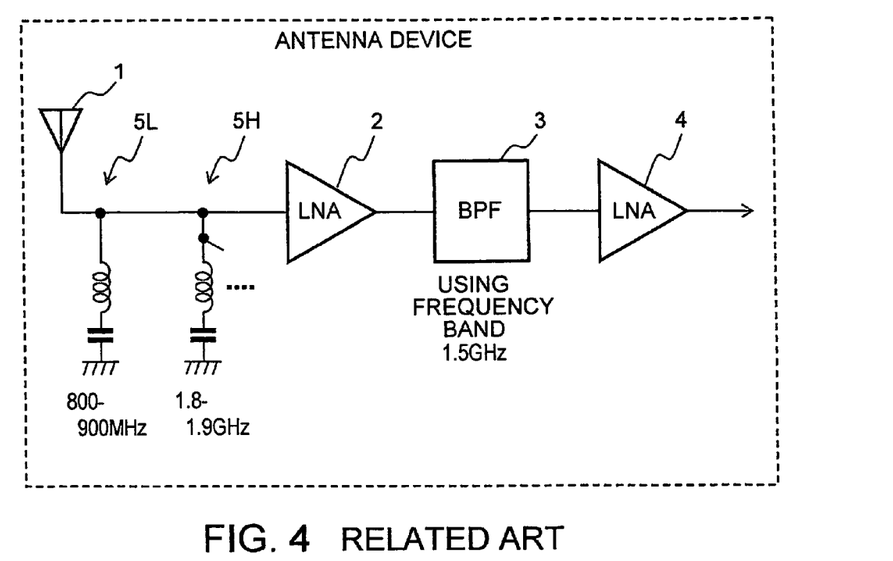
FIG. 4 is a block diagram showing a related antenna device different from that shown in FIG. 1.
Figure 5:
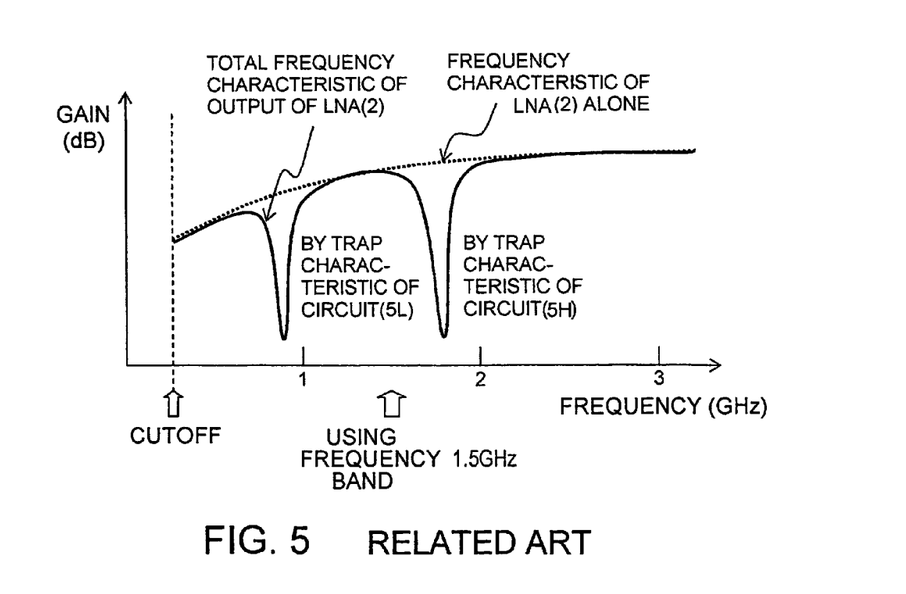
FIG. 5 is a graph showing an example of the frequency characteristic of the output of an initial-stage LNA shown in FIG. 4.

An antenna device adapted to avoid such jamming waves due to the general-use bands is disclosed, for example, in Japanese Unexamined Patent Application Publication No. 2005-109602 (JP 2005-109602 A2). In this antenna device disclosed in JP 2005-109602 A2, as shown in FIG. 4, first and second trap circuits 5L and 5H adapted to reject the passage of specific band frequencies of 800 to 900 MHz and 1.8 to 1.9 GHz, respectively, which may be jamming waves, are added at an input portion of an initial-stage LNA 2 connected to an antenna 1. Accordingly, as shown in FIG. 5, an input signal in 1.5 GHz band intended for use is supplied to the initial-stage LNA 2 without containing jamming waves at nearby frequencies and passes through the initial-stage LNA 2 so as to be produced.

Further, as disclosed, for example, in Japanese Unexamined Patent Application Publication No. 2004-260555 (JP 2004-260555 A2), there is a receiver in which a filter is interposed between an antenna and a low-noise amplifier (LNA) when the input power of interference waves, whose influence is large due to wideband operation, is large.

As described above, in the related antenna devices, the circuit element for rejecting the jamming waves is required per specific use on the outside of the low-noise amplifier. Consequently, an increase in size and cost of the antenna devices cannot be avoided.

Therefore, it is an object of this invention to provide an antenna device that has a jamming wave rejecting function and further that realizes cost reduction.

SUMMARY OF THE INVENTION

This invention has a main feature that it is a low-noise amplifier for amplifying an input signal to produce an amplified signal, comprising a frequency selection circuit supplied with said input signal for selecting a pass band intended for use from said input signal to produce a selected signal having the pass band, said frequency selection circuit serving as a filter having a low-side cutoff frequency near to said pass band on its low-frequency side, thereby cutting off frequencies lower than the low-side cutoff frequency; and a low-noise amplification portion supplied with the selected signal for amplifying the selected signal to produce the amplified signal.

This low-noise amplifier makes it possible to provide the low-side cutoff frequency which is higher than a using frequency band of a mobile terminal.

This low-noise amplifier makes it possible to provide a frequency selection circuit which serves as a band-pass filter having a high-side cutoff frequency near the pass band on its high-frequency side.

According to another aspect of this invention, there is provided an antenna device of a receiver, comprising an antenna adapted to receive a signal to produce a received signal, an initial-stage low-noise amplifier for amplifying the received signal to produce an amplified signal, and a band-pass filter adapted to pass, as a pass band, a frequency band intended for use in said amplified signal, wherein said initial-stage low-noise amplifier comprises a frequency selection circuit for selecting a pass band intended for use from said input signal to produce a selected signal having the pass band and serving as a filter having a low-side cutoff frequency near to said pass band on its low-frequency side, thereby cutting off frequencies lower than the low-side cutoff frequency; and a low-noise amplification portion for amplifying the selected signal to the amplified signal.

This antenna device makes it possible to further comprise a trap circuit disposed between said antenna and initial-stage low-noise amplifier for removing one or both of frequency bands near the pass band on its low-frequency and high-frequency sides.

According to another aspect of this invention, there is provided a low-noise amplifier for amplifying an input signal to produce an amplified signal, comprising an input matching circuit supplied with said input signal to produce a matched signal, said input matching circuit comprising a capacitor and at least one inductor, said capacitor and said at lest one inductor having predetermined capacitance and inductance values so as to form a filter having a low-side cutoff frequency near a pass band intended for use on its low-frequency side, thereby cutting off frequencies lower than the low-side cutoff frequency; an impedance conversion portion supplied with the matched signal for achieving impedance matching with an output of an antenna to produce a converted signal, and a low-noise amplification portion for amplifying the converted signal to produce the amplified signal.

This low-noise amplifier makes it possible to provide the low-side cutoff frequency which is higher than a using frequency band of a mobile terminal and the input matching circuit which serves as a band-pass filter having a high-side cutoff frequency near the pass frequency band on its high-frequency side.

According to another aspect of this invention, there is provided an antenna device comprising an antenna element adapted to receive a signal to produce a received signal, an initial-stage low-noise amplifier for amplifying the received signal to produce an amplified signal, and a band-pass filter adapted to pass, as a pass band, a frequency band intended for use in the amplified signal, wherein the initial-stage low-noise amplifier comprises an input matching circuit supplied with said received signal to produce a matched signal, said input matching circuit comprising a capacitor and at least one inductor, said capacitor and said at least one inductor having predetermined capacitance and inductance values so as to form a filter having a low-side cutoff frequency neat the pass band on its low-frequency side, thereby cutting off frequencies lower than the low-side cutoff frequency, an impedance conversion portion supplied with the matched signal for achieving impedance matching with an output of said antenna element to produce a converted signal, and a low-noise amplification portion for amplifying the converted signal to produce the amplified signal.

This antenna device makes it possible to further comprise a trap circuit disposed between said antenna element and said initial-stage low-noise amplifier for removing one or both of frequency bands near the pass band on its low-frequency and high-frequency sides.

DESCRIPTION OF THE PREFERRED EMBODIMENTS

This invention will be described in further detail with reference to the accompanying drawings.

The object of providing an antenna device capable of realizing both the avoidance of jamming waves and the cost reduction is achieved by preventing entry of jamming waves at frequencies near a signal frequency band intended for use by the use of an initial-stage low-noise amplifier connected to an antenna. For this purpose, the initial-stage low-noise amplifier uses an input matching circuit thereof also as a filter adapted to interrupt or cut off those jamming frequencies. As a result, in principle, it becomes unnecessary to dispose a filter outside the initial-stage low-noise amplifier in the antenna device.

First Embodiment

A first embodiment of this invention will be described with reference to FIGS. 6 and 7.

Figure 6:
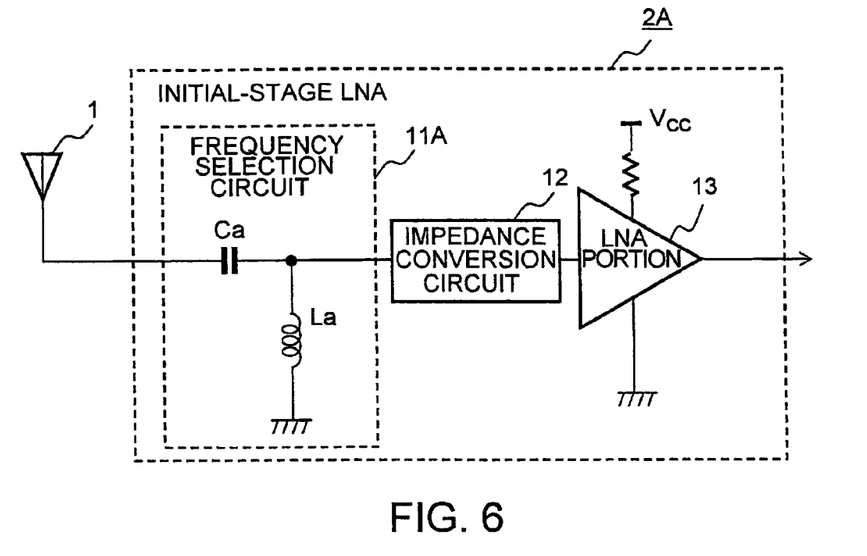
FIG. 6 is a block diagram showing an initial-stage LNA (low-noise amplifier) according to a first embodiment of this invention.
Figure 7:
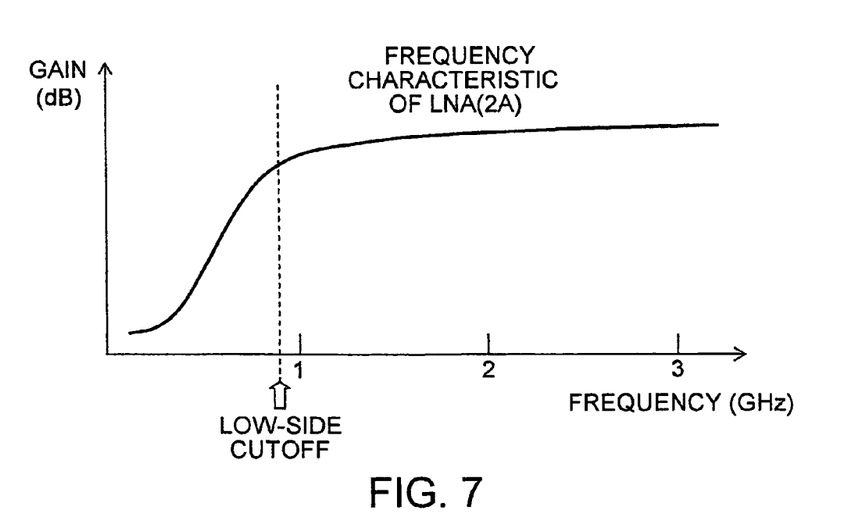
FIG. 7 is a graph showing an example of the frequency characteristic in the initial-stage LNA of FIG. 6.

FIG. 6 is a block diagram showing an initial-stage low-noise amplifier (LNA) 2A according to the first embodiment of this invention and FIG. 7 is an explanatory diagram showing a frequency characteristic thereof.

As shown in FIG. 6, the initial-stage LNA 2A comprises a frequency selection circuit 11A, an impedance conversion circuit 12, and an LNA portion (low-noise transistors) 13. The LNA portion 13 comprises the low-noise transistors each of which is, for example, a CMOSFET such as a GaAsFET or a HEMT.

Directly connected to an antenna 1, the frequency selection circuit 11A serves as an input matching circuit for the LNA portion 13 and comprises a capacitor Ca and an inductor La. The capacitor Ca is a coupling capacitor for capacitance adjustment inserted between the antenna 1 and the impedance conversion circuit 12. The inductor La connects an input end of the impedance conversion circuit 12 to ground for grounding the gates of the low-noise transistors and may be a pattern inductor using a resistor, an inductor, and so on.

On the other hand, an antenna device gives consideration to the GPS (Global Positioning System), satellite digital radio broadcasting services, and so on in Japan and the U.S.A. and to general satellite radiowave-services and so on in Europe, Russia, and so on. Therefore, it is designed so that the initial-stage LNA 2A directly connected to the antenna 1 is adapted to receive signals from satellites over a wide frequency range on the order of gigahertz (GHz). However, since 800 to 900 MHz for mobile cellular telephones with a high frequency of use can be jamming waves, it is necessary to avoid such jamming waves. For this purpose, the frequency selection circuit 11A is designed to serve as the input matching circuit for the LNA portion 13 and further serve as a high-pass filter (HPF). For example, the capacitance value of the capacitor Ca and the inductance value of the inductor La are set so as to form the high-pass filter having a cutoff frequency of 900 MHz, as a low-side cutoff frequency, as shown in FIG. 7.

Given that the cutoff frequency is "fc", the capacitance value (Ca) of the capacitor Ca and the inductance value (La) of the inductor La are set so as to satisfy $fc=1/2\pi\sqrt{(Ca \cdot La)}$.

Further, the impedance conversion circuit 12 is required for allowing the LNA portion 13 to have impedance matching with an output of the antenna 1. The LNA portion 13 has a high input-impedance and, therefore, the impedance matching with a 50-ohm impedance of the antenna 1 is required on the input side of the low-noise transistors. For this purpose, the impedance conversion circuit 12 comprising a pattern having a quarter-wavelength ($\lambda/4$) is connected to the input side of the LNA portion 13.

Since such a frequency selection circuit 11A is provided, the level of signals input into the antenna due to low-band frequencies including 800 to 900 MHz for mobile cellular telephones for general use, i.e. with a high frequency of use, and higher harmonics thereof is lowered. Therefore, a particular filter for avoiding jamming waves is not required on the input side of the initial-stage low-noise amplifier 2A with respect to those signals received from most satellites and, hence, the antenna device can realize both the avoidance of jamming waves and the cost reduction.

In the foregoing description, the frequency selection circuit 11A serves as the high-pass filter having the cutoff frequency of 900 MHz. However, if the cutoff frequency is not limited to 900 MHz, but is set so as to remove frequencies in a general-use frequency band, which is closest to a frequency band intended for use and can be jamming waves, and frequencies lower than it, it is quite effective because higher harmonics thereof can also be blocked.

Second Embodiment

A second embodiment of this invention will be described with reference to FIGS. 8 and 9.

Figure 8:
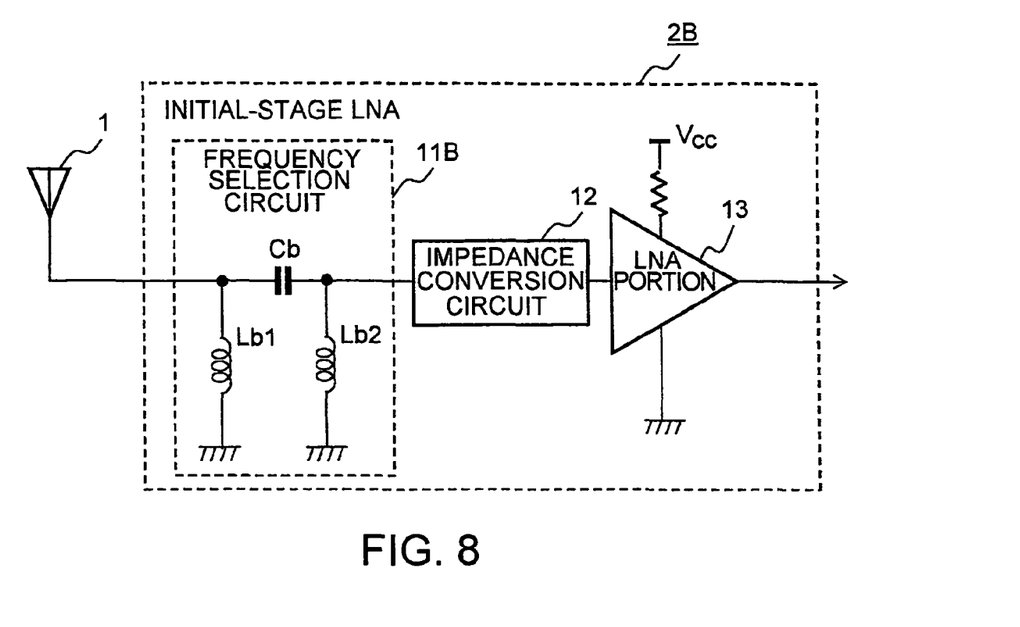
FIG. 8 is a block diagram showing an initial-stage LNA according to a second embodiment of this invention, which differs from that shown in FIG. 6.
Figure 9:
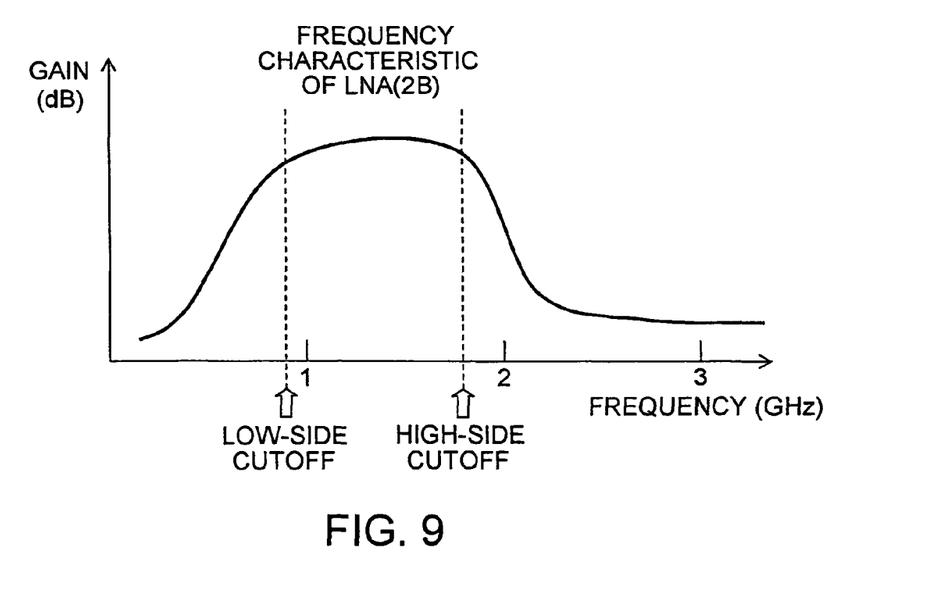
FIG. 9 is a graph showing an example of the frequency characteristic in the initial-stage LNA of FIG. 8.

FIG. 8 is a block diagram showing an initial-stage low-noise amplifier (LNA) 2B according to the second embodiment of this invention and FIG. 9 is an explanatory diagram showing a frequency characteristic thereof.

As shown in FIG. 8, the initial-stage LNA 2B comprises a frequency selection circuit 11B, an impedance conversion circuit 12, and an LNA portion 13. Since the impedance conversion circuit 12 and the LNA portion 13 have the same structures as those in the foregoing first embodiment, explanation thereof is omitted.

The embodiment of FIG. 8 differs from the embodiment of FIG. 6 in that the frequency selection circuit 11B serves as a band-pass filter (BPF) while the high-pass filter (HPF) is used in FIG. 6.

Specifically, the frequency selection circuit 11B comprises a capacitor Cb interposed between an antenna 1 and the impedance conversion circuit 12, a first inductor Lb1 interposed between a connection path between the capacitor Cb and the antenna 1 and a ground, and a second inductor Lb2 interposed between a connection path between the capacitor Cb and the impedance conversion circuit 12 and the ground. The frequency selection circuit 11B is designed so as to form the band-pass filter having, for example, a pass-band of 900 MHz to 1.8 GHz as shown in FIG. 9. That is, the capacitance value of the capacitor Cb and the inductance values of the first and the second inductors Lb1 and Lb2 are set so as to form the foregoing band-pass filter.

With this configuration, the low-noise amplifier 2B according to this embodiment can selectively receive signals at desired frequencies as compared with the foregoing first embodiment.

The foregoing band-pass filter (BPF) of the frequency selection circuit 11B has the pass-band of 900 MHz to 1.8 GHz. However, the pass-band thereof can be adjusted by setting the capacitance value of the capacitor Cb and the inductance values of the inductors Lb1 and Lb2 according to a using frequency band.

Third Embodiment

A third embodiment of this invention will be described with reference to FIGS. 10 and 11.

Figure 10:
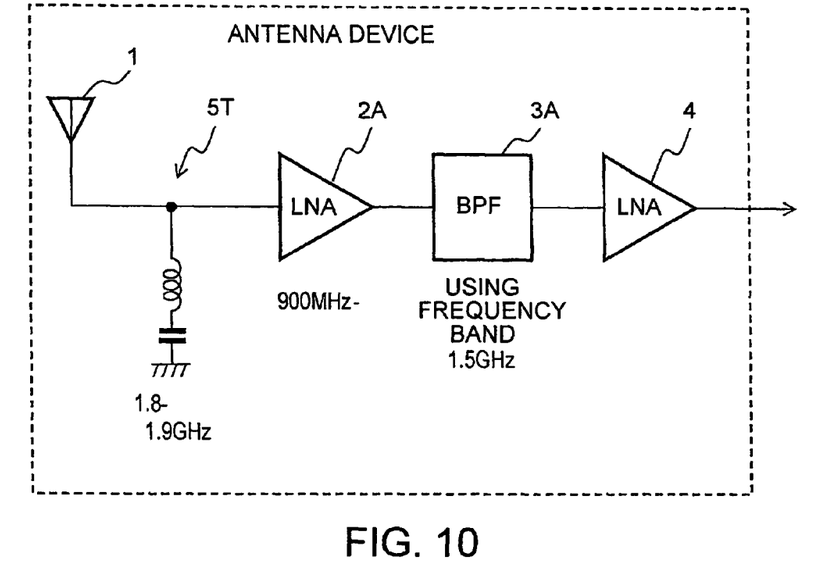
FIG. 10 is a block diagram showing an antenna device according to a third embodiment of this invention.
Figure 11:
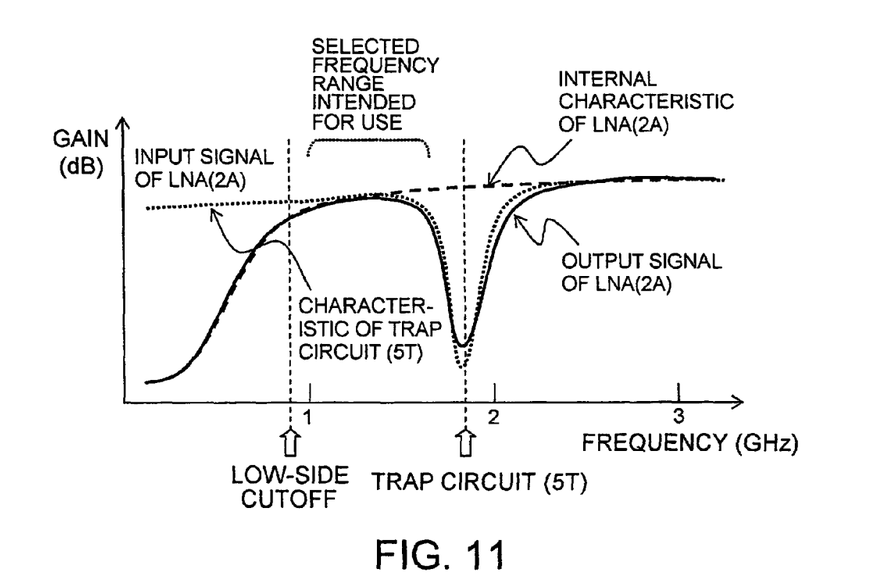
FIG. 11 is a graph showing an example of the frequency characteristic in the antenna device of FIG. 10.

FIG. 10 is a block diagram showing an antenna device according to the third embodiment of this invention, wherein the antenna device includes the initial-stage low-noise amplifier (LNA) 2A described in the foregoing first embodiment, and FIG. 11 is an explanatory diagram showing a frequency characteristic thereof.

As shown in FIG. 10, the antenna device is a circuit in which a trap circuit 5T is connected to a series-connected circuit comprising an antenna 1, an initial-stage LNA 2A, a BPF 3, and a last-stage LNA 4 connected in series and feeds its output to a demodulation circuit (not shown). The initial-stage LNA 2A is the initial-stage amplifier described in the foregoing first embodiment and is directly connected to the antenna 1. The BPF 3 is a band-pass filter adapted to pass frequencies in a band intended for use. The last-stage LNA 4 is a low-noise amplifier added to the initial-stage LNA 2A and, if necessary, a plurality of LNAs 4 may further be provided on the input side of the BPF 3.

The trap circuit 5T is a natural frequency rejecting circuit in the form of a series circuit of a capacitor and an inductor and is provided between a connection path between the antenna 1 and the initial-stage LNA 2A and a ground. That is, the values of the capacitor and the inductor are set so as to reject frequencies that become jamming waves for this receiver.

For example, as shown in FIG. 11, the initial-stage LNA 2A cuts off frequencies lower than 900 MHz. On the other hand, the trap circuit 5T can be designed so as to cut off frequencies from 1.8 GHz to 1.9 GHz. Therefore, this antenna device can feed signals at pure frequencies from 900 MHz to 1.8 GHz to the BPF 3. As a result, signals to the demodulation circuit can be produced at pure frequencies in 1.5 GHz band intended for use.

The trap circuit 5T is set so as to interrupt the frequencies from 1.8 GHz to 1.9 GHz. However, for example, it can be set so as to interrupt frequencies around 2.4 to 2.5 GHz, thereby corresponding to a using 2.4 GHz frequency band of satellite radio broadcasting services, i.e. the frequencies to be interrupted can be adjusted according to using frequencies.

While this invention has been described in terms of the embodiments, the invention is of course not limited thereto.

According to this invention, by the use of a high-pass filter adapted to reject general-use low-band frequencies near a frequency band intended for use at an input portion in an amplifying circuit using low-noise transistors, it is possible to easily carry out removal of jamming waves and simplification of the structure. Thus, this invention is applicable to a use where it is necessary and essential to realize various general-purpose amplifying circuits each having a limited frequency band intended for use.

What is claimed is:

1. A low-noise amplifier for amplifying an input signal to produce an amplified signal, comprising:

an input matching circuit supplied with said input signal to produce a matched signal, said input matching circuit comprising a capacitor and at least one inductor, said capacitor and said at least one inductor having predetermined capacitance and inductance values so as to form a filter having a low-side cutoff frequency near a pass band intended for use on its low-frequency side, thereby cutting off frequencies lower than the low-side cutoff frequency;

an impedance conversion portion, supplied with the matched signal, for achieving impedance matching with an output of an antenna to produce a converted signal; and a low-noise amplification portion for amplifying the converted signal to produce the amplified signal, wherein said input matching circuit serves as a band-pass filter having a high-side cutoff frequency near the pass band on its high-frequency side.

2. A low-noise amplifier according to claim 1, wherein the low-side cutoff frequency is higher than a using frequency band of a mobile terminal.

3. An antenna device, comprising:

an antenna element adapted to receive a signal to produce a received signal;

an initial-stage low-noise amplifier for amplifying the received signal to produce an amplified signal; and a band-pass filter adapted to pass, as a pass band, a frequency band intended for use in the amplified signal, wherein the initial-stage low-noise amplifier comprises:

an input matching circuit supplied with said received signal to produce a matched signal, said input matching circuit comprising a capacitor and at least one inductor, said capacitor and said at least one inductor having predetermined capacitance and inductance values so as to form a filter having a low-side cutoff frequency near the pass band on its low-frequency side, thereby cutting off frequencies lower than the low-side cutoff frequency;

an impedance conversion portion, supplied with the matched signal, for achieving impedance matching with an output of said antenna element to produce a converted signal; and a low-noise amplification portion for amplifying the converted signal to produce the amplified signal, wherein said input matching circuit serves as a band-pass filter having a high-side cutoff frequency near the pass band on its high-frequency side.

4. An antenna device according to claim 3, further comprising a trap circuit, disposed between said antenna element and said initial-stage low-noise amplifier, for removing one or both of frequency bands near the pass band on its low-frequency and high-frequency sides.

5. An antenna device, comprising:

an antenna element adapted to receive a signal to produce a received signal;

a trap circuit for removing one or both of frequency bands near a pass band on its low-frequency and high-frequency sides;

an initial-stage low-noise amplifier for amplifying the received signal passing through said trap circuit to produce an amplified signal; and a band-pass filter adapted to pass, as the pass band, a frequency band intended for use in the amplified signal, wherein the initial-stage low-noise amplifier comprises:

an input matching circuit supplied with said received signal through said trap circuit to produce a matched signal, said input matching circuit comprising a capacitor and at least one inductor, said capacitor and said at least one inductor having predetermined capacitance and inductance values so as to form at least one of a filter having a low-side cutoff frequency near the pass band on its low-frequency side and a filter having a high-side cutoff frequency near the pass band on its high-frequency side;

an impedance conversion portion, supplied with the matched signal, for achieving impedance matching with an output of said antenna element to produced a converted signal; and a low-noise amplification portion for amplifying the converted signal to produce the amplified signal.

* * * * *